(12) United States Patent
Moreshead

(10) Patent No.: US 7,494,945 B2
(45) Date of Patent: Feb. 24, 2009

(54) THIN FILM ENERGY FABRIC

(75) Inventor: Wylie Moreshead, Bainbridge Island, WA (US)

(73) Assignee: Energy Integration Technologies, Inc., Bainbridge Island, WA (US)

( * ) Notice: Subject to any disclaimer, the term of this patent is extended or adjusted under 35 U.S.C. 154(b) by 129 days.

(21) Appl. No.: 11/439,572

(22) Filed: May 23, 2006

(65) Prior Publication Data

US 2006/0280948 A1 Dec. 14, 2006

Related U.S. Application Data

(60) Provisional application No. 60/684,890, filed on May 26, 2005.

(51) Int. Cl.
*D03D 15/00* (2006.01)
*B32B 27/12* (2006.01)

(52) U.S. Cl. ............... 442/185; 442/186; 442/228; 442/286; 442/301; 429/127

(58) Field of Classification Search ............. 442/228, 442/286, 301, 185, 186; 429/127
See application file for complete search history.

(56) References Cited

U.S. PATENT DOCUMENTS

| 2,751,427 | A | 6/1956 | Woodring | 136/111 |
|---|---|---|---|---|
| 2,798,896 | A | 7/1957 | Bly | 136/181 |
| 3,023,259 | A | 2/1962 | Coler et al. | 136/6 |
| 3,353,999 | A | 11/1967 | Osborn | 136/83 |
| 3,535,494 | A | 10/1970 | Armbruster | 219/528 |
| 3,627,988 | A | 12/1971 | Romaniec | 219/529 |
| 4,470,263 | A | 9/1984 | Lehovec et al. | 62/3 |
| 4,522,897 | A | 6/1985 | Walsh | 429/119 |
| 4,700,054 | A | 10/1987 | Triplett et al. | 219/545 |
| 5,242,768 | A | 9/1993 | Nagatsuka et al. | 429/127 |
| 5,269,368 | A | 12/1993 | Schneider et al. | 165/46 |
| 5,695,885 | A | 12/1997 | Malhi | 429/7 |
| 6,049,062 | A | 4/2000 | Jones | 219/211 |
| 6,322,527 | B1 | 11/2001 | Talish | 601/2 |
| 6,637,906 | B2 | 10/2003 | Knoerzer et al. | 362/84 |
| 6,906,436 | B2 | 6/2005 | Jenson et al. | 307/116 |
| 7,186,309 | B2 * | 3/2007 | Mercuri et al. | 156/220 |
| 2001/0045547 | A1 * | 11/2001 | Senecal et al. | 252/501.1 |
| 2002/0069448 | A1 | 6/2002 | Appolonia | |
| 2003/0064292 | A1 * | 4/2003 | Neudecker et al. | 429/235 |
| 2003/0211797 | A1 * | 11/2003 | Hill et al. | 442/205 |
| 2004/0188418 | A1 | 9/2004 | Aisenbrey | 219/528 |

FOREIGN PATENT DOCUMENTS

| CA | 2377363 | A1 | 9/2003 |
|---|---|---|---|
| DE | 20216927 | U1 | 3/2003 |
| EP | 1529857 | A1 | 5/2005 |
| WO | 02054896 | A1 | 7/2002 |

* cited by examiner

*Primary Examiner*—Norca L Torres-Velazquez
(74) *Attorney, Agent, or Firm*—Seed IP Law Group PLLC

(57) ABSTRACT

A material is provided that includes a first section for storing energy and a second section for releasing energy received from the first section in which the energy is preferably electrical energy that is used for one from among heat dissipation, heat generation, light emission and powering of an electric circuit. Ideally the material includes a third layer adapted to collect energy and convert the energy to electrical energy for storage in the first section. A fourth protection section is provided on at least one side of the material. The material can be formed of woven strips, laminated sections, or in coaxial sections that are woven together to form a flexible fabric material having at least one characteristic from among breathability, wickability, moisture resistance, moisture-proof, and stretchability.

29 Claims, 4 Drawing Sheets

THIN FILM ENERGY FABRIC

BACKGROUND OF THE INVENTION

1. Field of the Invention

The present invention is directed to thin, flexible material and, more particularly, to a flexible fabric having electrical energy storage and release capabilities integrally formed therewith.

2. Description of the Related Art

There are currently materials that incorporate energy releases in the form of light or heat and are powered by some external, rigid power source.

For example, Coler et al., U.S. Pat. No. 3,023,259, describes a flexible battery that is designed, in one embodiment, to wrap around a person under their clothing so that body heat may be utilized to maintain the electrochemical temperature within a preferred temperature range. The flexible battery includes a flexible electrode that incorporates a wire mesh selected of a metal non-reactive with components of the electrochemical system. A coating composition is provided that includes an active electrode material, electrically conductive particles, and a synthetic resin binder. Coler et al. teach the use of heat to maintain the flexible battery within a preferred operating temperature range.

Armbruster, U.S. Pat. No. 3,535,494, illustrates the use of metal foil material that is flexible and includes a layer of plastic material and small particles of electrically conductive material substantially uniformly distributed throughout the layer of plastic material. A low voltage supply provides electric current that passes in a direction substantially normal to opposing faces through the sheet material and in which the sheet material and the metal foils thereto are sandwiched between a pair of plastic sheets to form with the latter a flexible heating unit.

Romaniec, U.S. Pat. No. 3,627,988, describes electrical heating elements utilizing conducted carded fibrous carbon web having flexible electrodes and a supporting layer of loosely woven fabric overlying and united with each face of the web.

Lehovec et al., U.S. Pat. No. 4,470,263, is entitled "Peltier-Cooled Garment" that attaches to a garment and having a cold plate bearing against the skin of a user. Heat collected by the cold plate is distributed through fins.

Triplett et al., U.S. Pat. No. 4,700,054, describe electric devices formed of a fabric prepared from at least one electrode and a substance of high resistance and to include a conductive polymer. The positive temperature coefficient of the resistance material has a resistivity that increases by a factor of at least 2.5 over a temperature range of 14° C. or by a factor of at least 10 over a temperature range of 100° C., and preferably both.

Nagatsuka et al., U.S. Pat. No. 5,242,768, is directed to a three-dimensional woven fabric for use inside of a battery. The fabric material itself is not a battery and would be incapable of storing electricity. It is designed to be used in a seawater battery containing an electrolyte.

Schneider et al., U.S. Pat. No. 5,269,368, is directed to a rechargeable temperature regulating device for controlling the temperature of a beverage or other object that utilizes fluid housed in a flexible jacket having an inner chamber. The jacket is recharged in a freezer or heated in a microwave, depending on the function to be performed.

Jones, U.S. Pat. No. 6,049,062, describes a heated garment with a temperature control that is worn on the body of an individual. The thermal garment includes an interior liner with a heating element disposed in the interior liner of the garment. The heating element is disposed within a majority of the area of the garment, and at least one flexible rechargeable battery is disposed within the interior liner of the thermal garment. A thermostat within the outer layer of the thermal garment and in communication with the heating element regulates the temperature.

Aisenbray, U.S. Publication No. 2004/0188418, discloses low cost heating devices manufactured from conductive loaded resin-based materials. Micron conductor fibers are provided, preferably of nickel plated carbon fiber, stainless steel fiber, copper fiber, silver fiber, or the like. Conductive loaded resin-based heating devices can be formed using methods such as injection molding, compression molding, or extrusion. The conductive loaded resin-based material that forms the heating devices can also be in the form of a thin flexible woolen fabric that can be readily cut to the desired shape.

Knoerzer, U.S. Pat. No. 6,637,906, discloses a flexible electroluminescent (EL) film that incorporates the battery directly into the thin film layer structure and would be used for lighted product packaging. The EL films or thin film electroluminescents (TFELs) described by Knoerzer are inorganic and consist of phosphor particles that illuminate when energized by electrical current. Knoerzer describes an inverter to change DC current from the battery into AC current which is used to illuminate the EL film. With the introduction of organic light emitting polymers (LEPs) and organic light emitting diodes (OLEDs), which are organic polymers, not phosphor films, there is no need for an inverter system, which is problematic to integrate into a completely flexible system. The manufacture of the organic polymers also presents several processing advantages over an inorganic EL film.

However, there is not currently a single fabric available to the engineer or designer that has the electrical energy storage aspect directly integrated into it and is still thin, flexible, and can be manufactured into a product with the same ease as conventional fabrics. Hence, there is a need in this day and age for such a fabric that also has all the normal characteristics of a modern engineered fabric, such as waterproof, breathability, moisture wickability, stretch, color and texture choices. So far no fabric has emerged with all these characteristics.

BRIEF SUMMARY OF THE INVENTION

The disclosed embodiments of the present invention are directed to a fabric with all the characteristics of a modern engineered fabric, such as water resistance, waterproof, moisture wickability, breathability, stretch, and color and texture choices, along with the ability to store electrical energy and release it to provide heating, cooling, lighting, and other uses of electrical energy. In addition, in one form of the invention there is the option of taking energy from its surroundings, converting it to electrical energy, and storing it inside the fabric for later use. With the advent and advancement of thin film deposition technology, polymer technology, MEMs, and new engineered materials, it is now possible to produce a fabric with all the above characteristics.

In one embodiment of the invention, a material is provided that includes an energy storage section and an energy release section. An optional charge section or recharge section can be provided along with optional treatment and sealing, and optional protective and decorative section. It should be noted that these sections can be arranged coplanar or layered as long as the sections are continually connected or enveloped together.

In accordance with another aspect of the present invention, the fabric includes one or more properties of semi-flexibility or flexibility, water resistance or waterproof, and formed as a thin, sheet-like material or a thin woven fabric.

In accordance with another aspect of the present invention, the fabric is formed from strips of material having the characteristics described above and that are woven together to provide a thin, flexible material that can utilized as a conventional fabric, such as inner or outer clothing worn by a user or as a component used in footware such as an insole or a specialized fabric panel.

In accordance with another embodiment of the invention, a flexible fabric material is provide that includes a first layer adapted to store electrical energy; and a second layer coupled to the first layer and configured to receive electrical energy from the first layer and to utilize the electrical energy for at least one from among heat dissipation, heat generation, light emission, and powering an electric circuit. Ideally, a third layer is provided, the third layer being coupled to the second layer and adapted to receive or collect energy and convert the received or collected energy to electrical energy for storage by the second layer for use by the first layer or both storage in the second layer and immediate use by the first layer simultaneously.

In accordance with another embodiment of the invention, a garment is provided that includes a flexible material comprising a first section configured to store energy and a second section configured to release energy received from the first section. Ideally, the material of the garment includes a third layer adapted to obtain energy and convert the obtained energy to electrical energy for storage in the second section.

In accordance with another embodiment of the invention, a method for forming a flexible material is provided. The method includes providing a first section configured to store energy; and providing a second section coupled to the first section and adapted to release energy received from the first section. Ideally, the method includes providing a third section adapted to receive or collect energy and convert energy to electrical energy for storage in the second section.

BRIEF DESCRIPTION OF THE SEVERAL VIEWS OF THE DRAWINGS

The foregoing and other features and advantages of the present invention will be more readily appreciated as the same become better understood from the following detailed description when taken in conjunction with the accompanying drawings, wherein.

DETAILED DESCRIPTION OF THE INVENTION

Figure 1:
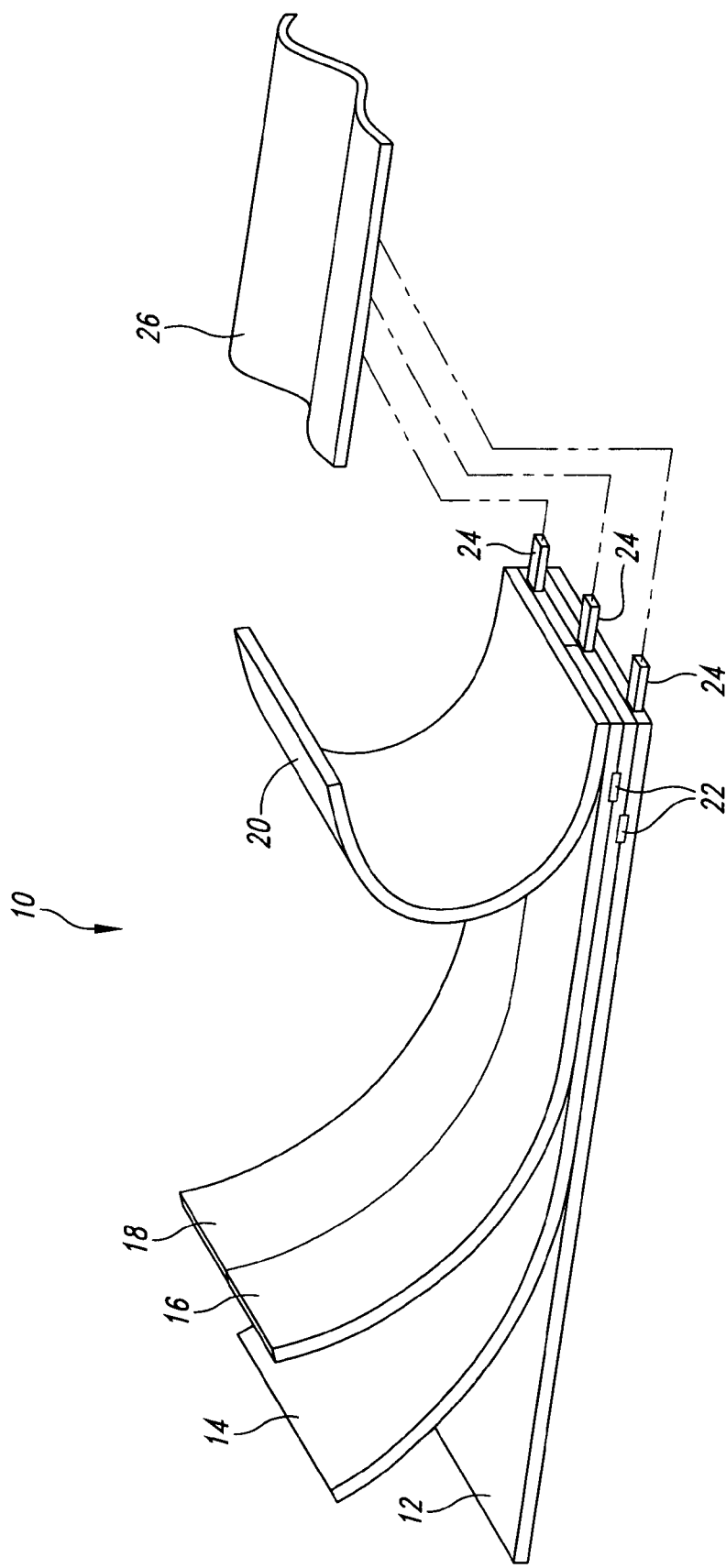
FIG. 1 is an isometric illustration of a first embodiment of a material formed in accordance with the present invention.

Referring initially to FIG. 1, shown therein is a flexible sheet 10 formed in accordance with one embodiment of the invention.

FIG. 1 serves to diagrammatically illustrate the flexible sheet form of the finished energy fabric 10 that includes an energy release section 12 and an energy storage section 14. An optional charge section 16 or recharge section 18 or combination thereof is shown along with an optional protective section 20 that can also be a decorative section. These sections can be manufactured separately and then laminated together or each section can be directly deposited on the one beneath it or a combination of both techniques can be employed to produce the final fabric. These sections can be arranged in any order including coplanar arrangements, layers, planes, and other stacking arrangements, and there can be multiple instances of each section in the final fabric.

The sections can also have different embodiments on the same plane. For instance, a section of the charge or recharge plane 16,18 can use photovoltaics while another section can use piezoelectrics or a section of the energy release plane can produce light while another section can produce heat. Similarly, one section of the plane can produce light while another section on the same plane can use photovoltaics to recharge the energy storage section. Some sections must be connected electrically to some of the other sections. This can be done with the contact occurring at certain points 22 directly between the sections or with the contact occurring though leads 24 that connect via a remote PCB 26, thus providing operator input, monitoring, and control capabilities. Although not required, this PCB 26 can be built on a flexible substrate as can the leads 24, and the PCB 26 can control multiple separate fabric instances simultaneously using control methods and devices known in the art and which will not be described in detail herein. Briefly, controls such as fixed and variable resistance, capacitance, inductance, and combinations of the forgoing, as well as software and firmware embodied in corresponding hardware can be implemented to regulate voltage and current, phase relationships, timing, and other known variables that ultimately affect the output. Regulation can be user controlled or automatic or a combination of both.

The leads 24 that connect the sections can, but do not have to be, connected to the remote PCB 26. All lead connections should be sealed at the point of contact to provide complete electrical insulation. The flexible PCB 26, which contains circuits, components, switches and sensors, can also be integrated directly into the final fabric as another section, coplanar or layered, and so can the leads.

One method of manufacturing the individual sections into a custom, energized textile panel would consist of: 1) locating the energy storage, energy release and possibly energy recharge sections adjacent to or on top of one another (depending on panel layout and functionality) 2) electrically interconnecting the various sections by affixing thin, flexible circuits to them that would provide the desired functionality and then 3) laminating this entire system of electrically integrated sections between breathable, waterproof films. The preferred materials in the heating embodiment of a panel would consist of lithium polymer for the energy storage section, PTC heaters for the energy release section, piezoelectric film for the recharge section, copper traces deposited on a polyester substrate for the thin, flexible electrical interconnects and a high Moisture Vapor Transmission Rate polyurethane film as the encapsulating film or protective section. While cloth material can be used, preferably it would be laminated over the encapsulant film. The cloth could be any type of material and would correspond to the decorative section as described herein. The type of cloth would completely depend on the desired color, texture, wickibility, and other characteristics of the exterior of the panel.

A thin film, lithium ion polymer battery, such as manufactured by Gaston Narada, Voltaflex, Solicore, Sanyo, Cymbet, Excellatron, Valence, Amperex or Enderel, is an ideal flexible thin, rechargeable, electrical energy storage section. The manufacturing details of these batteries are proprietary but each consists of a thin film anode layer, cathode layer, and electrolytic layer and each battery forms a thin, flexible sheet that stores and releases electrical energy and is rechargeable. Carbon nanotubes are now also being used by Advanced Battery Technologies, Inc., in conjunction with the lithium polymer battery technology to increase capacity and would be integrated into the final fabric in the same manner as would a standard polymer battery. It should be noted that the energy storage section should consist of a material whose properties do not degrade with use and flexing. In the case of lithium polymers, this generally means the more the electrolyte is plasticized, the less the degradation of the cell that occurs with flexing.

Another technology that can be used for the energy storage section is a supercapacitor or ultracapacitor of the types being developed and manufactured by Skeleton Technologies, Cooper Electronic Technology's PowerStor Aerogel, and Telcordia Technologies. These types of supercapacitors use different technologies to achieve a thin, flexible, rechargeable energy storage film and are good examples in the ultra- and super-capacitor industry as to what is currently available commercially for integration and use in this invention.

Thin film micro fuels cells of different types (PEM, DFMC, solid oxide, MEMS and hydrogen) are also becoming available from companies such as NEC, Toshiba, Millennium Cell, MTI Micro and Nippon Telegraph and Telephone Corporation that can be laminated into the final fabric to provide an integrated power source to work in conjunction with (hybridized), or in place of, a thin film battery or thin film capacitor storage section.

In the energy release section there are several embodiments, including but not limited to heating, cooling and light emission.

For the heating embodiment, a normal thin wire or etched thin film resistance heater as manufactured by Minco, Birk Manufacturing, Tempco or Qfoil by ECG Enterprises, Inc., works well. A PTC or positive temperature coefficient resistive heater as manufactured by Conductive Technologies, Thermo, or ITW Chronotherm also works very well for a thin film, self-regulating, heater section. In the case of the PTC, its heater is built to regulate itself specifically to a temperature determined before manufacture. This means that the resistive heating element changes it's resistance depending on the instantaneous temperature of the heater without the use of sensors and added circuitry. All these heating elements are deposited on a thin flexible substrate, usually kapton or polyester, which can then be laminated with or without an adhesive to the other fabric sections or the heating elements can be directly deposited on an adjoining fabric section. For instance the heater element can be deposited directly on the packaging layer of a lithium polymer battery and then covered with a thin film of polyester, kapton, urethane or some other thin flexible material to encapsulate and insulate the heating element and/or fabric section.

For the cooling embodiment of the energy release section, a thin film, superlattice, thermoelectric cooling device as being developed and produced by ITR international is ideal for integration into the final fabric. Being a thin film device, it can be deposited using another of the fabric sections as it's substrate or it can be deposited on a separate substrate and then laminated with or without an adhesive to the other existing fabric sections.

For the light emitting embodiment of the energy release sections, there are many organic polymer based thin film technologies available for integration into the fabric. Organic light emitting diodes (OLEDs) manufactured by OSRAM, Cambridge Display Technologies, and Universal Display Corporation are polymer based devices that are manufactured in thin, flexible, sheet form and can be powered directly from a DC power source without an inverter. Some other examples of applicable organic, flexible, light emitting technologies that use DC power without an inverter include, polymeric light emitting diodes (PLEDs) manufactured by Cambridge Display Technologies, light emitting polymers (LEPs) also manufactured by Cambridge Display Technologies, Electronic Ink manufactured by E-Ink and flexible liquid crystal displays (LCDs) currently being developed and manufactured by Sarnoft, Softpixel, Samsung and Toshiba. The light emitting embodiment of the fabric can be used to display a static lit design or a changing pixilated display. Being thin film devices, all these technologies can be deposited using another of the fabric sections as their substrate or they can be deposited on separate substrates and then laminated with or without adhesives to the other existing fabric sections.

There are many currently available options for the charge and recharge section in it's several embodiments. In the case that the embodiment is using light energy to charge or recharge the energy storage section, several photovoltaic manufacturers such as ETA Engineering's Unisolar, and Iowa Thin Film Technology's Powerfilm, produce thin, flexible photovoltaic cells.

In the case that the embodiment is using fabric flexure and piezoelectric materials to generate electricity for storage in the energy storage section, companies such as Continuum's PiezoFlex, Mide's Poweract, Measurement Specialties' Piezo Film and Advanced Cerametrics Incorporated produce films that are easily laminated and electrically integrated into the final fabric.

In the case that the embodiment is using a magnetic, inductive or wireless charging system to produce electrical energy for storage, Companies such as Splashpower and Salcomp currently manufacture technology that can be laminated and electrically integrated into the final fabric.

It should also be noted that in the case of a thermoelectric (Peltier), or photoelectric(photovoltaic) section that is used as an energy release embodiment, this section can also be used in a reversible fashion as a energy recharging section for the energy storage section(s). For example, if a system is producing a large amount of excess heat energy, say in the case of a garment used during high aerobic activity, that heat energy can be converted by the thermoelectric section to electricity for storage in the energy storage section(s) and can then be used reversibly back through a thermoelectric section for heating when there is an absence of heat after the aerobic activity has stopped. The same sort of energy harvesting technique could be used by the photoelectric (photovoltaic) sections to produce light when there's an absence of it and to also transform the light energy to electrical energy for storage in the energy storage sections when there is an excess of it. In the case of the piezoelectric embodiment, electrical energy can be created and stored during flexing and then used reversibly to stiffen the piezoelectric section if a stiffening of the fabric is required. This text describes only a few embodiments of the reversible fabric sections whereas there are many possible section permutations within the embodiments described.

There are many available products that can be used for the protective and decorative section(s). Malden Mills is a good example of a supplier that has a broad product line with many applicable products. For example their product line includes sections that are engineered for next-to-skin wickability, fibrous, fleece-type comfort, water repellency, specific color, specific texture and many other characteristics that can be incorporated by laminating that section into the final fabric. There are also many ThemoPlastic Urethanes (TPUs) available for use as sealing and protective envelopes. These materials exhibit very high Moisture Vapor Transmission Ratios (MVTRs) and are extremely waterproof allowing the assembled energy storage, release and recharge sections to be enveloped in a highly breathable, waterproof material that also provides a high degree of protection and durability. Some companies currently manufacturing these TPUs are American Polyfilm, Inc. (API), Onmiflex, and Noveon. In addition to the TPUs, which are a solid monolithic structure, there are also microporous materials that are available for use as breathable, waterproof sealing and protective envelopes. This microporous technology is commonly found in Gore products and can also be used in conjunction with TPUs. It should also be noted that when laminating these breathable waterproof envelopes around the assembled sections, care must be taken, whether you're using an adhesive or not, to maintain the breathability of the laminate. If adhesive is being used, this adhesive must also have breathable characteristics. The same should be said for a laminate process that does not use adhesive. Whatever the adhesion process is, it needs to maintain the breathability and waterproofness of the enveloping protective section providing these are traits deemed necessary for the final textile panel.

Figure 2:
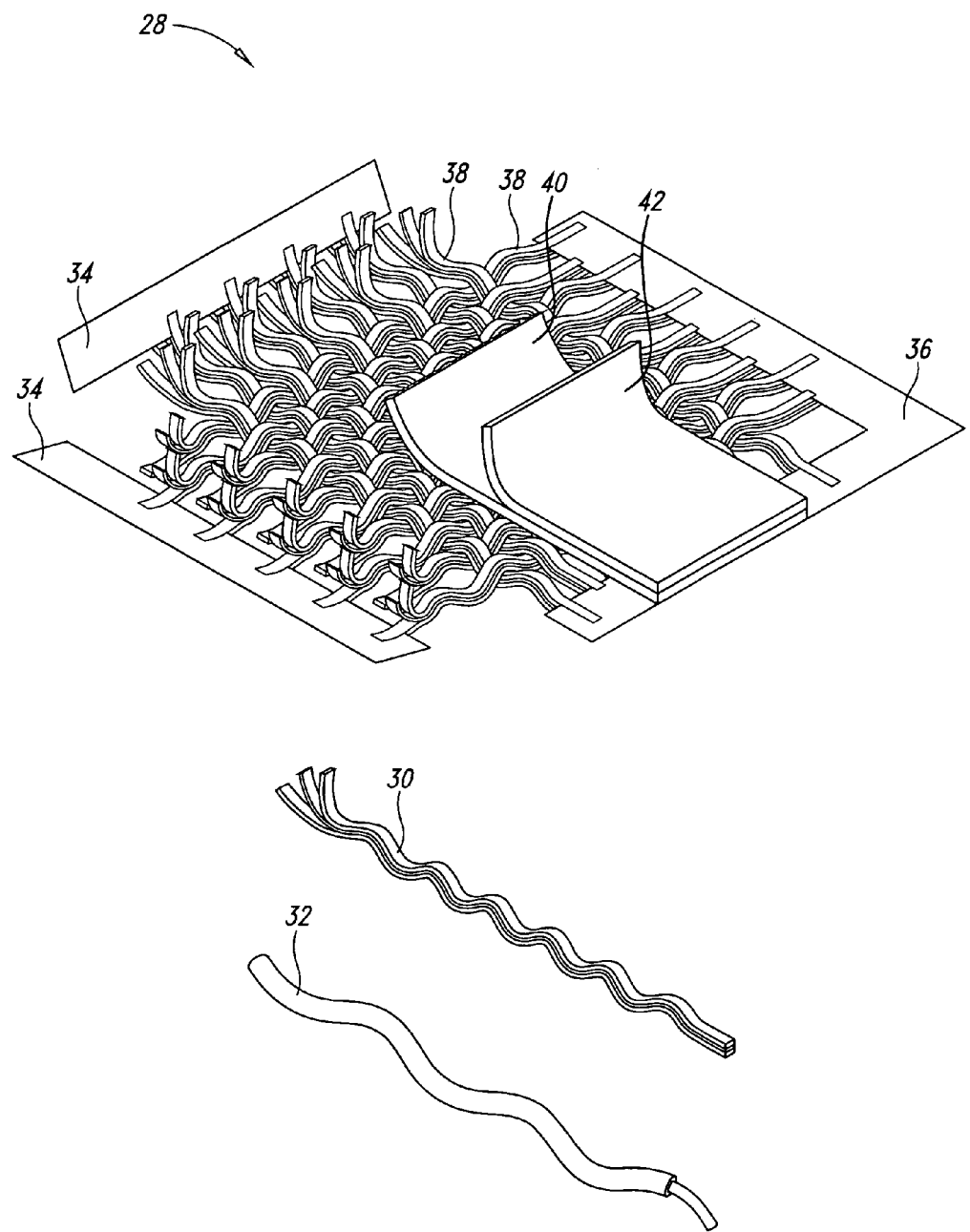
FIG. 2 is an isometric illustration of another embodiment of a sheet-like material formed in accordance with the present invention.

FIG. 2 illustrates the highly flexible woven form of a finished energy fabric 28 that includes woven strips 30 where each individual strip contains an energy release section, an energy storage section and an optional charge\recharge section. The strips 30 would not necessarily need to be constructed with rectangular sections, they can also be constructed with coaxial sections 32. The strips 30 can, but would not have to all be, electrically connected at the edge 34 of the fabric 28 with similar contacts 36 on the warp and weft of the weave being isolated at the same potential as applicable for the circuit to function. All of the strips 30 do not necessarily have to have the same characteristics. For instance, strips with different energy release embodiments can be woven into the same piece of fabric as shown at 38.

An optional treatment or sealing section 40 can be deposited on one or both sides of the final fabric 28 to facilitate the waterproof and breathability properties of the fabric. This enveloping section keeps liquid water from passing through but allows water vapor and other gases to move through it freely. This type of deposition is well known to those skilled in the art and will not be described in more detail herein. An excellent example would be the proprietary layers GoreTex applies to fabric to make it waterproof and breathable. It should be noted there are many alternative coatings to Goretex currently commercially available, including ThermoPlastic Urethanes such as the ones manufactured by API, Omniflex or Noveon. An optional protective or decorative section 42 can also be added to change external properties of the final fabric such as texture, durability, stretchability or moisture wickability.

Figure 3:
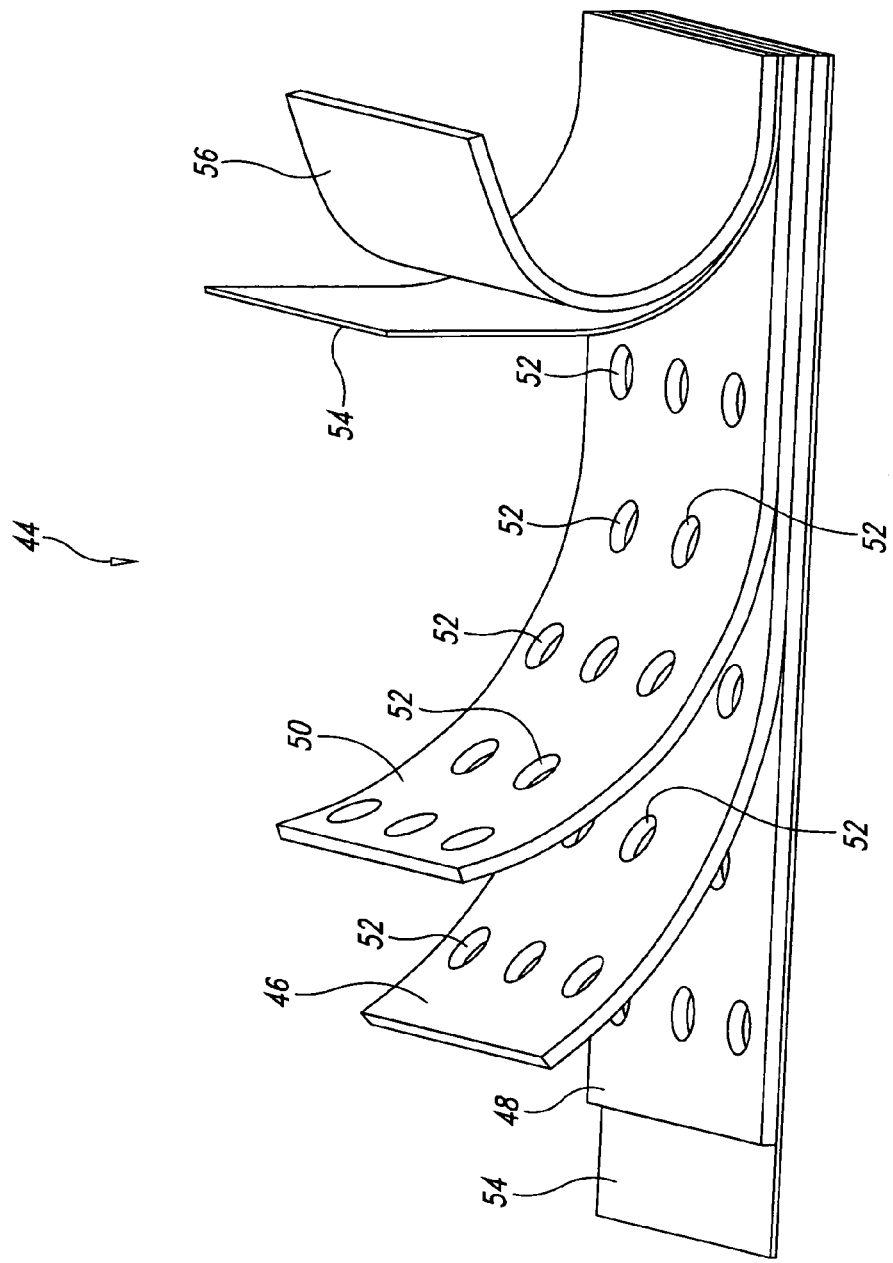
FIG. 3 is an isometric illustration of a yet a further embodiment of a thin film fabric formed in accordance with the present invention.

FIG. 3 illustrates a highly flexible sheet 44 consisting of an energy storage section 46, an energy release section 48, and an optional charge or recharge section 50, all patterned with openings 52 to impart traits such as breathability and flexibility to the final fabric. These openings or holes 52 in the fabric 44 can be deposited in a pattern for each section, with the sections then laminated together such that the patterns line up to provide an opening through the fabric covered only by a treatment or sealing enveloping section 54, and possibly a decorative or protective section 56 or the fabric 44 can have holes 52 cut into it after lamination but before the application of the treatment or sealing section 54 or the decorative or protective section 56 or both. It should be noted that these holes 52 can be of any shape.

The treatment or sealing section (54) can be deposited or adhered onto and envelope one or both sides of the final fabric 44 to facilitate the waterproof and breathability properties of the fabric 44. This section keeps liquid water from passing through the section but allows water vapor and other gases to move through the fabric section freely. This type of deposition is known to those skilled in the art and will not be described in detail herein. An excellent example would be the proprietary layers that the Goretex company applies to fabric to make it waterproof and breathable. It should be noted that there are many alternative coatings or films to Goretex currently commercially available, including ThermoPlastic Urethanes such as the ones manufactured by API, Omniflex or Noveon. The optional decorative or protective section 56 can also be added to one or both sides of the fabric 44 to change external properties of the final fabric such as texture, durability or moisture wickability. As with the fabric embodiments in FIGS. 1 and 2, the sections can have different embodiments on the same plane. For instance, a section of the charge or recharge section 50 can use photovoltaics while another section can use piezoelectrics or a section of the energy release plane can produce light while another section can produce heat. Similarly, one section of the plane can produce light while another section on the same plane can use photovoltaics to recharge the energy storage section. The sections can also be arranged in any order including coplanar arrangements as well as stacking arrangements and there can be multiple instances of each section in the final fabric.

Figure 4:
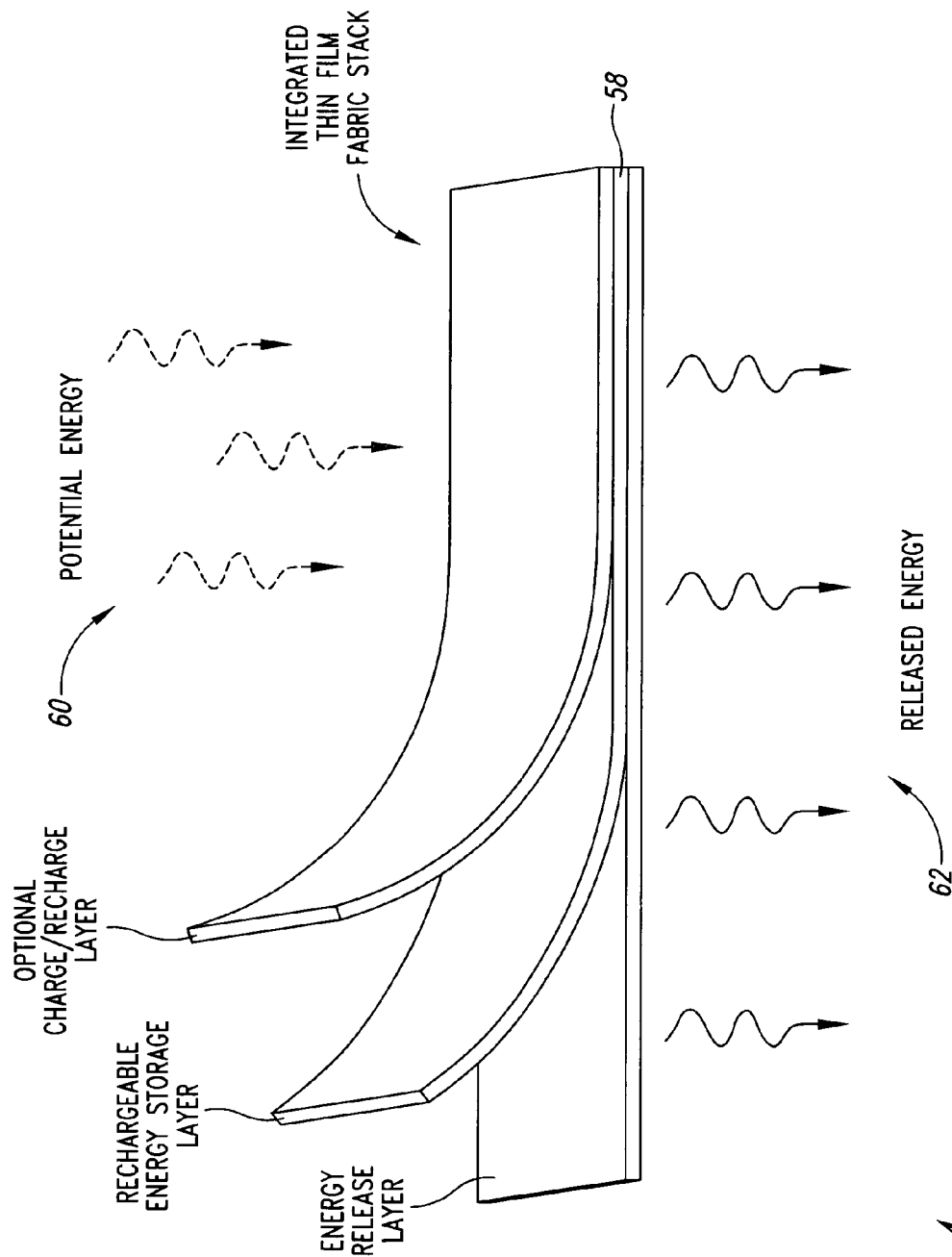
FIG. 4 is an isometric illustration of yet another embodiment of the present invention showing energy flow into and out of the fabric.

FIG. 4 illustrates a flexible, integrated fabric 58 capable of receiving surrounding energy 60 from many possible sources, converting it to electrical energy and storing it integral to the fabric, and then releasing the electrical energy in different ways 62. This illustration shows only one embodiment of the fabric sections whereas there are many possible section permutations within the embodiments described.

From the foregoing it will be appreciated that, although specific embodiments of the invention have been described herein for purposes of illustration, various modifications may be made without deviating from the spirit and scope of the invention. For example, although a representative embodiment has been described in terms of "sections," it is to be understood that the present invention can take the form of layers, plies, filaments, strips, belts, and the like. Accordingly, the invention is not limited except as by the appended claims and the equivalents thereof.

The invention claimed is:

1. A laminate sheet-like material, comprising:
   a first section configured to receive and store electrical energy; and
   a second section configured to utilize the electrical energy stored in the first section for use in at least one from among heat dissipation, heat generation, and light emission, the second section encapsulated with the first section in a laminate to form a sheet-like material.

2. The material of claim 1 further comprising a third section coupled to at least the first section and formed with the first and second sections in the laminate to provide a charge from ambient energy to be stored in the first section or to be used by the second section.

3. The material of claim 1 further comprising at least one protective section formed on at least one side of the material.

4. The material of claim 1 wherein the first section is configured to store electrical energy.

5. The material of claim 1 wherein the first and second sections are formed to be flexible and to have at least one of the following characteristics of breathability, moisture wickability, water resistance, waterproof, and stretchability.

6. The material of claim 5 wherein the first and second sections comprise first and second layers, respectively, and are arranged adjacent to one another.

7. The material of claim 1, further comprising means for regulating at least one of energy storage and energy release in the first and second sections, respectively.

8. A laminate sheet-like flexible fabric material, comprising:
   a first layer adapted to receive and store electrical energy; and
   a second layer coupled to the first layer and configured to receive electrical energy from the first layer and to utilize the electrical energy for at least one from among heat dissipation, heat generation, and light emission, the second layer laminated to the first layer to form a multi-layer sheet-like flexible fabric material.

9. The material of claim 8, comprising a third layer electrically coupled to the second layer and laminated with the first and second layers, the third layer adapted to collect energy and convert the collected energy to electrical energy for storage by the first layer for immediate use by the second layer or both storage in the first layer and use by the second layer simultaneously.

10. The material of claim 9, further comprising at least one protective layer adapted to protect the first, second, and third layers without interfering with the collection, conversion, storage, and use of energy.

11. The material of claim 8, further comprises a control device for regulating at least one of energy storage and energy utilization by the first and second layers, respectively.

12. A flexible fabric material adapted to be woven to provide a thin flexible fabric for use with an electric circuit, the material comprising:
   a first flexible filament adapted to receive and store electrical energy;
   a second flexible filament coupled to and laminated with the first flexible filament and adapted to receive the stored energy from the first flexible filament for use in at least one from among heat dissipation, heat generation, and light emission; and
   electrically insulating material encapsulating the first and second flexible filaments with at least one electrical contact at a terminating end of the material to form a laminated sheet-like flexible fabric material.

13. The material of claim 12, comprising a third flexible filament adapted to obtain ambient energy and convert the obtained energy to electrical energy for storage in the first flexible filament, the third flexible filament laminated in the electrically insulating material and electrically coupled to the first flexible filament.

14. The material of claim 12 wherein the first and second flexible filaments are layered with respect to one another.

15. The material of claim 13 wherein the first, second, and third flexible filaments are in a layered arrangement.

16. The material of claim 12, comprising a regulator for controlling at least one of energy storage and energy usage in the first and second flexible filaments, respectively.

17. A garment or accessory, comprising:
   a laminated, sheet-like flexible material comprising a first section configured to receive and store electrical energy and a second section configured to utilize the electrical energy stored in the first section for use in at least one from among heat dissipation, heat generation, and light emission, the second section encapsulated with the first section in a laminate to form a sheet-like material.

18. The garment or accessory of claim 17 wherein the material comprises a third section adapted to obtain ambient energy and convert the obtained ambient energy to electrical energy for storage in the second section.

19. The garment or accessory of claim 18, further comprising a protective layer formed on at least one side of the flexible material.

20. The garment or accessory of claim 19 wherein the material has at least one characteristic from among breathability, moisture wickability, water resistance, waterproof, and stretchability.

21. The garment of claim 17, comprising a device for controlling at least one of energy storage and energy release in the first and second sections, respectively.

22. A method of making a laminated, sheet-like flexible material, comprising:
   providing a first section configured to receive and store electrical energy;
   providing a second section coupled to the first section and adapted to utilize the electrical energy stored in the first section for use in at least one from among heat dissipation, heat generation, and light emission, the second section encapsulated with the first section in a laminate to form a sheet-like material.

23. The method of claim 22, comprising forming a third section with the first and second sections, the third section adapted to collect ambient energy and convert the ambient energy to electrical energy for storage in the second section.

24. The method of claim 23, comprising providing at least one protective section on at least one side of the material.

25. The method of claim 22 wherein the material includes at least one characteristic from among breathability, wickability, water resistance, waterproof, and stretchability.

26. The method of claim 22 wherein the first and second sections are formed as individual plies that are layered together.

27. The method of claim 23 wherein the first, second, and third sections are formed as flexible filaments layered together to form a laminated flexible filament, and further comprising weaving the layered flexible filament to form the flexible material.

28. The material of claim 13 wherein the first, second, and third flexible filaments are in a coaxial arrangement.

29. The material of claim 12 wherein the first and second flexible filaments are in a tubular arrangement.

* * * * *